United States Patent
Park et al.

(10) Patent No.: US 9,460,482 B2
(45) Date of Patent: Oct. 4, 2016

(54) SYSTEM ON CHIP INCLUDING CONFIGURABLE IMAGE PROCESSING PIPELINE AND SYSTEM INCLUDING THE SAME

(71) Applicant: SAMSUNG ELECTRONICS CO., LTD., Suwon-si, Gyeonggi-do (KR)

(72) Inventors: Sun Hee Park, Suwon-si (KR); Jin Soo Park, Seoul (KR); Nak Woo Sung, Yongin-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 193 days.

(21) Appl. No.: 14/477,368

(22) Filed: Sep. 4, 2014

(65) Prior Publication Data

US 2015/0091916 A1    Apr. 2, 2015

(30) Foreign Application Priority Data

Oct. 2, 2013    (KR) .................. 10-2013-0117682

(51) Int. Cl.
G06T 1/20    (2006.01)
G06F 1/32    (2006.01)
G06T 3/40    (2006.01)

(52) U.S. Cl.
CPC ............... *G06T 1/20* (2013.01); *G06F 1/3206* (2013.01); *G06T 3/40* (2013.01)

(58) Field of Classification Search
CPC .................................. G06T 1/20; G06T 3/40
See application file for complete search history.

(56) References Cited

U.S. PATENT DOCUMENTS

| | | |
|---|---|---|
| 5,493,335 A | 2/1996 | Parulski et al. |
| 5,838,373 A | 11/1998 | Hasegawa et al. |
| 6,292,218 B1 | 9/2001 | Parulski et al. |
| 6,529,640 B1 | 3/2003 | Utagawa et al. |
| 7,068,316 B1 | 6/2006 | Pine |
| 7,295,231 B1 | 11/2007 | Kaku |
| 7,468,752 B2 | 12/2008 | Kalevo |
| 7,589,748 B2 | 9/2009 | Ahn |
| 7,787,026 B1 | 8/2010 | Flory et al. |
| 7,808,533 B2 | 10/2010 | Tsuda |
| 8,045,018 B2 | 10/2011 | Uchida et al. |
| 2003/0007703 A1* | 1/2003 | Roylance ................. G06T 1/20 382/303 |
| 2008/0001953 A1* | 1/2008 | Nagao ...................... G06T 1/20 345/502 |
| 2012/0013761 A1 | 1/2012 | Oishi |
| 2015/0091914 A1* | 4/2015 | Cote ....................... G06T 1/20 345/506 |

FOREIGN PATENT DOCUMENTS

| | | |
|---|---|---|
| JP | 06-315083 | 11/1994 |
| JP | 2003-158665 | 5/2003 |
| JP | 2003-324656 | 11/2003 |

(Continued)

*Primary Examiner* — Charles Tseng
(74) *Attorney, Agent, or Firm* — F. Chau & Associates, LLC

(57) ABSTRACT

A system on chip (SoC) including a configurable image processing pipeline is provided. The SoC includes a bus; a first image processing module configured to be connected to the bus and to process image data; a first image processing stage configured to transmit either first image data or second image data received from the bus to at least one of the bus and the first image processing module through a first bypass path in response to first control signals; and a second image processing stage configured to transmit either third image data received from the first image processing module or fourth image data received from the bus to the bus through one of a second bypass path and a second scaler path in response to second control signals.

18 Claims, 10 Drawing Sheets

(56) References Cited

FOREIGN PATENT DOCUMENTS

| | | |
|---|---|---|
| JP | 2005-303367 | 10/2005 |
| JP | 2005-303815 | 10/2005 |
| JP | 2006-054641 | 2/2006 |
| JP | 2006-074677 | 3/2006 |
| JP | 2007-110221 | 4/2007 |
| JP | 2006-301294 | 12/2008 |
| KR | 1020060082442 | 7/2006 |
| KR | 1020130012749 | 2/2013 |

* cited by examiner

SYSTEM ON CHIP INCLUDING CONFIGURABLE IMAGE PROCESSING PIPELINE AND SYSTEM INCLUDING THE SAME

CROSS-REFERENCE TO RELATED APPLICATIONS

This application claims priority under 35 U.S.C. §119(a) to Korean Patent Application No. 10-2013-0117682 filed on Oct. 2, 2013, which is hereby incorporated by reference in its entirety.

1. TECHNICAL FIELD

Embodiments of the inventive concept relate to a system on chip (SoC), and more particularly, to a SoC including an image processing pipeline configurable according to the purpose of use and a system including the SoC.

2. DISCUSSION OF THE RELATED ART

In order to convert image data having a given resolution into image data having a resolution different from the given resolution, performing a method for changing resolution, e.g., an image scaling method is required. To perform the image scaling method, an image processing device including a scaler needs to read image data from a memory where the image data of the given resolution is stored. Since the image processing device needs to read image data from the memory whenever performing the image scaling method, memory latency, i.e., the time taken for the image processing device to read the image data from the memory is significant. Moreover, when a mobile communication device such as smart phone includes the image processing device, power consumption of the scaler affects power consumption of the mobile communication device.

SUMMARY

According to an aspect of the inventive concept, there is provided a system on chip (SoC) including a bus; a first image processing module configured to be connected to the bus and to process image data; a first image processing stage configured to transmit either first image data or second image data received from the bus to at least one of the bus and the first image processing module (e.g., through a first bypass path) in response to first control signals; and a second image processing stage configured to transmit either third image data received from the first image processing module or fourth image data received from the bus to the bus through one of a second bypass path and a second scaler path in response to second control signals.

When the first image processing stage further includes a first scaler path, the first image processing stage may transmit either the first image data or the second image data to at least one of the bus and the first image processing module through one of the first bypass path and the first scaler path in response to third control signals including the first control signals.

The third image data may be related with image data output from the first image processing stage or image data received through the bus.

The scale ratio (or first predetermined output resolution) of a first scaler included in the first scaler path may be different from the scale ratio (or a second predetermined output resolution) of a second scaler included in the second scaler path.

The SoC may further include a register configured to generate the second control signals and the third control signals. Alternatively, the SoC may further include a central processing unit (CPU) configured to execute software related with generation of the second control signals and the third control signals.

The SoC may further include one of a second image processing module and a third image processing stage, which are connected to the bus. The second image processing stage may transmit image data, which is transmitted through one of the second bypass path and the second scaler path, to at least one between the one of the second image processing module and the third image processing stage using switches.

According to an aspect of the inventive concept, there is provided a SoC including a bus; a first image processing module configured to be connected to the bus and to process image data; a first image processing stage configured to transmit either first image data or second image data received from the bus to at least one of the bus and the first image processing module through at least one of a first bypass path and a first scaler path in response to first control signals; and a second image processing stage configured to transmit either third image data received from the first image processing module or fourth image data received from the bus to the bus through a second bypass path in response to second control signals.

When the second image processing stage further includes a second scaler path, the second image processing stage may transmit either the third image data or the fourth image data to the bus through one of the second bypass path and the second scaler path in response to third control signals including the second control signals.

A scale ratio of a first scaler included in the first scaler path may be different from a scale ratio of a second scaler included in the second scaler path.

The SoC may further include a register configured to generate the first control signals and the third control signals. Alternatively, the SoC may further include a CPU configured to execute software related with generation of the first control signals and the third control signals.

The SoC may further include switches configured to control connection between the first image processing module and the bus.

According to an aspect of the inventive concept, there is provided an image processing system including a plurality of image data sources and an application processor configured to control an operation of the image data sources.

The application processor may include a bus; a first image processing module configured to be connected to the bus and to process image data; a first image processing stage configured to transmit either first image data output from one of the image data sources or second image data received from the bus to at least one of the bus and the first image processing module (e.g., through a first bypass path) in response to first control signals; and a second image processing stage configured to transmit either third image data received from the first image processing module or fourth image data received from the bus to the bus through one of a second bypass path and a second scaler path in response to second control signals.

When the first image processing stage further includes a first scaler path, the first image processing stage may transmit either the first image data or the second image data to at least one of the bus and the first image processing module through one of the first bypass path and the first scaler path in response to third control signals including the first control signals.

According to an aspect of the inventive concept, there is provided an image processing system including a plurality of image data sources and an application processor configured to control an operation of the image data sources.

The application processor may include a bus; a first image processing module configured to be connected to the bus and to process image data; a first image processing stage configured to transmit either first image data or second image data received from the bus to at least one of the bus and the first image processing module through at least one of a first bypass path and a first scaler path in response to first control signals; and a second image processing stage configured to transmit either third image data received from the first image processing module or fourth image data received from the bus to the bus through a second bypass path in response to second control signals.

When the second image processing stage further includes a second scaler path, the second image processing stage may transmit either the third image data or the fourth image data to the bus through one of the second bypass path and the second scaler path in response to third control signals including the second control signals.

BRIEF DESCRIPTION OF THE DRAWINGS

The above and other features of the inventive concept will become more apparent to persons skilled in the art by describing in detail exemplary embodiments thereof with reference to the attached drawings in which.

DETAILED DESCRIPTION OF THE EMBODIMENTS

Figure 1:
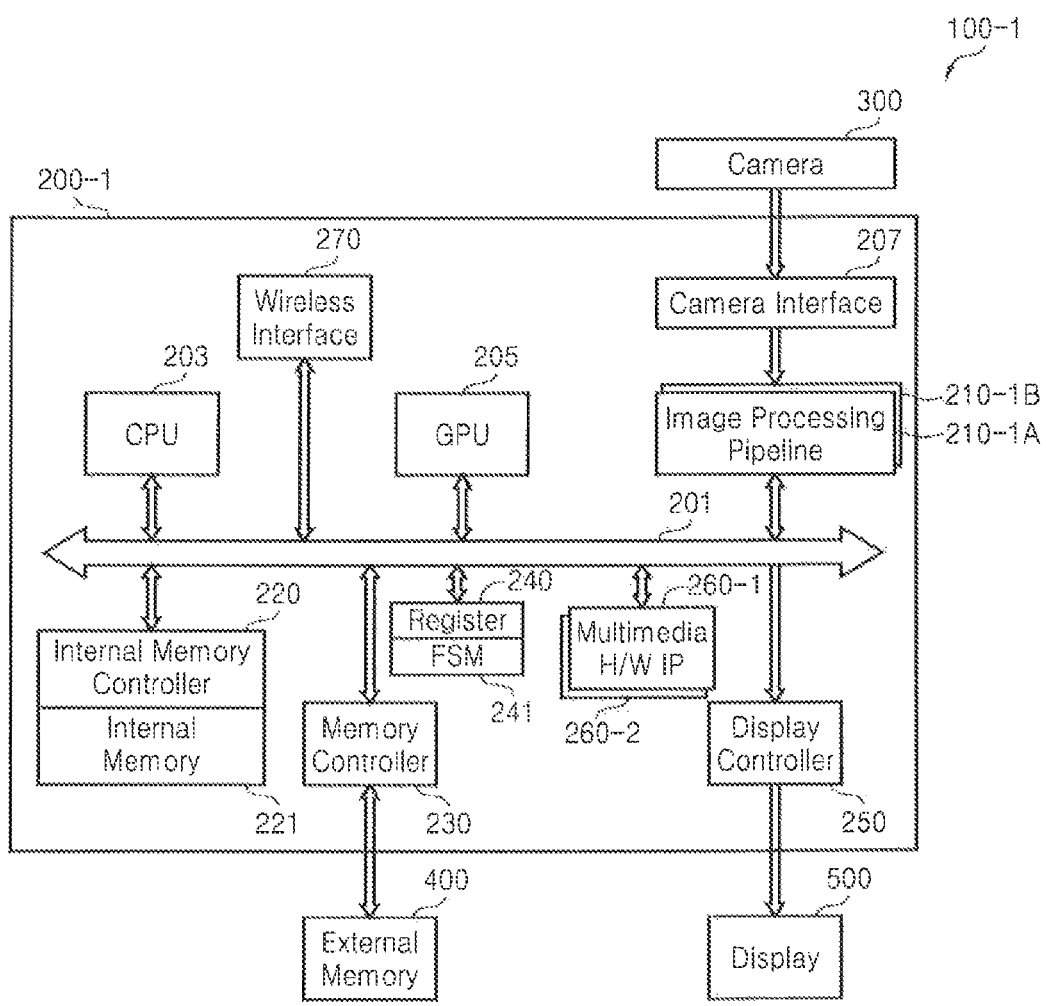
FIG. 1 is a block diagram of an image processing system according to an embodiment of the inventive concept.

The inventive concept now will be described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs.

FIG. 1 is a block diagram of an image processing system 100-1 according to an embodiment of the inventive concept. The image processing system 100-1 can process (e.g., scale) image data (e.g., still image data or moving image data). The image processing system 100-1 includes a processor 200-1, a camera 300, an external memory 400, and a display 500.

The image processing system 100-1 may be implemented as a mobile telephone, a smart phone, a tablet personal computer (PC), a mobile internet device (MID), a digital camera, a wearable computer, an internet of things (IoT) device, an internet of everything (IoE) device, or a video camera recorder. The image processing system 100-1 may support computing platforms, e.g., camera 2.0, for computational photography.

The processor 200-1 can process (e.g., scale) image data output from one of a plurality of image data sources (e.g., an internal memory 221, at least one multimedia hardware (H/W) intellectual property (IP) 260-1 and/or 260-2 (collectively denoted by 260), a wireless interface 270, a camera 300, and the external memory 400) through at least one image processing pipeline 210-1A and/or 210-1B and may output processed (e.g., scaled) image data to the internal memory 221, the at least one multimedia H/W IP 260, the wireless interface 270, the external memory 400, and/or the display 500. The camera 300 may be an image sensor manufactured using complementary metal oxide semiconductor (CMOS) technology.

The processor 200-1 can be implemented as an integrated circuit (IC) or a system on chip (SoC). The processor 200-1 may be an application processor or a mobile application processor. The processor 200-1 includes a central processing unit (CPU) 203, a graphics processing unit (GPU) 205, a camera interface 207, the at least one configurable image processing pipeline 210-1A and/or 210-1B (collectively denoted by 210-1), an internal memory controller 220, the internal memory 221, a memory controller 230, a register 240, a finite state machine (FSM) 241, a display controller 250, the at least one multimedia H/W IP 260, and the wireless interface 270.

The CPU 203 can control the operations of at least one of the elements 205, 210-1, 220, 230, 240, 241, 250, and 260 through a bus 201. The CPU 203 can execute an operating system (OS) necessary to control the processor 200-1 or at least one application. The CPU 203 includes at least one core and may include multiple cores.

The CPU 203 may also control the interfaces 207 and 270. In addition, the CPU 203 can control an H/W component (e.g., the register 240 or the FSM 241), that generates control signals (e.g., selection signals and/or switch signals) necessary for the at least one image processing pipeline 210-1, and/or a software (S/W) component (e.g., S/W related to the generation of the control signals).

The selection signals and/or the switch signals may be generated using the finite state machine (FSM) 241. The FSM 241 may be implemented in various alternative embodiments by a computer program or by application-specific sequential logic circuits. When the FSM 241 is implemented as the computer program, the FSM 241 may be a program executed by the processor 200-1, e.g., the CPU 203. When the FSM 241 is implemented as the sequential logic circuits, the FSM 241 may be implemented within the processor 200-1.

The GPU 205 can process image data output from the image sources 210-1, 221, 300, 400, and 270.

The camera interface 207 can transmit image data from the camera 300 to the image processing pipeline 210-1 or to another element, e.g., 205, 220, 230, 250, 260, or 270. The camera interface 207 may support low-voltage differential signaling (LVDS), mobile industry processor interface (MIPI®) camera serial interface (CSI), or high-speed serial interface. When the camera interface 207 supports MIPI® CSI, the camera 300 and the camera interface 207 may communicate with each other using MIPI CSI.

Each of the image processing pipelines 210-1A and 210-1B can control (or dynamically adjust) the effective number of scalers that will be used to scale image data, using the selection signals and the switch signals. Each of the image processing pipelines 210-1A and 210-1B can dynamically connect at least one scaler in series in response to the selection signals and the switch signals.

Although only two image processing pipelines 210-1A and 210-1B are illustrated in FIG. 1 for sake of convenience in the description, this is just an example. The number and positions of image processing pipelines implemented in the processor 200-1 may be variously selected by designers or manufacturers.

The internal memory controller 220 is connected between the bus 201 and the internal memory 221 and the internal memory controller 220 handles image data between the bus 201 and the internal memory 221. For example, the internal memory 221 may be implemented by static random access memory (SRAM) or a register file and the internal memory 221 may store image data, which has been processed or will be processed by the image processing pipeline 210-1A and/or 210-1B, according to the control of the internal memory controller 220.

The memory controller 230 can control transmission of image data between the processor 200-1 and the external memory 400. The external memory 400 can be implemented by dynamic random access memory (DRAM), a solid state drive (SSD), a multimedia card (MMC), an embedded MMC (eMMC), or a universal flash storage (UFS).

The register 240 can store data (e.g., a configuration table) needed to generate the selection signals and/or the switch signals. The register 240 is an example of memory programmable by the CPU 203 or by another master (not shown) implemented in the processor 200-1 and can be implemented by volatile memory or non-volatile memory. In various other embodiments, the register 240 may be an H/W component or a register file.

The FSM 241 generates the selection signals and/or the switch signals in association with the register 240. When the generation of the selection signals is controlled by S/W executed in the CPU 203, the processor 200-1 need not include the distinct register 240 that stores signals necessary for the reconfiguration of the image processing pipeline 210-1A and/or 210-1B.

The display controller 250 transmits image data that has been processed by the processor 200-1 to the display 500. The display controller 250 may support digital video formats such as LVDS, embedded DisplayPort (eDP), MIPI®, or high-speed serial interface, or analog video transmission formats. When the display controller 250 supports MIPI® display serial interface (DSI), the display controller 250 and the display 500 can communicate with each other using MIPI® DSI.

The display 500 may be implemented by a thin film transistor liquid crystal display (TFT-LCD), a light emitting diode (LED) array display, an organic LED (OLED) display, an active matrix OLED (AMOLED) display, or a flexible display. Each of the controllers 220 and 230 may perform the functions of a direct memory access (DMA) controller.

The multimedia H/W IP 260-1 and/or 260-2 can be implemented by a video codec. The video codec is a device or S/W that can compress or decompress digital video data. The multimedia H/W IP 260-1 and/or 260-2 may be implemented by a device or S/W that supports a Joint Photographic Experts Group (JPEG) standard such as MPEG.

The multimedia H/W IP 260-1 and/or 260-2 can be implemented as a scaler not included in the image processing pipeline 210-1A and/or 210-1B or as an H/W accelerator for multimedia. For instance, the multimedia H/W IP 260-1 and/or 260-2 may process image data which will be input to the at least one image processing pipeline 210-1A and/or 210-1B or image data output from the at least one image processing pipeline 210-1A and/or 210-1B.

The wireless interface 270 can convert image data externally received through wireless connection into image data that can be processed by the processor 200-1 or may convert image data received through the bus 201 into image data to be transmitted through wireless connection. The wireless interface 270 can support the Institute of Electrical and Electronics Engineers (IEEE) 802.11 standard, Long Term Evolution (LTE™), or wireless internet.

Figure 2:
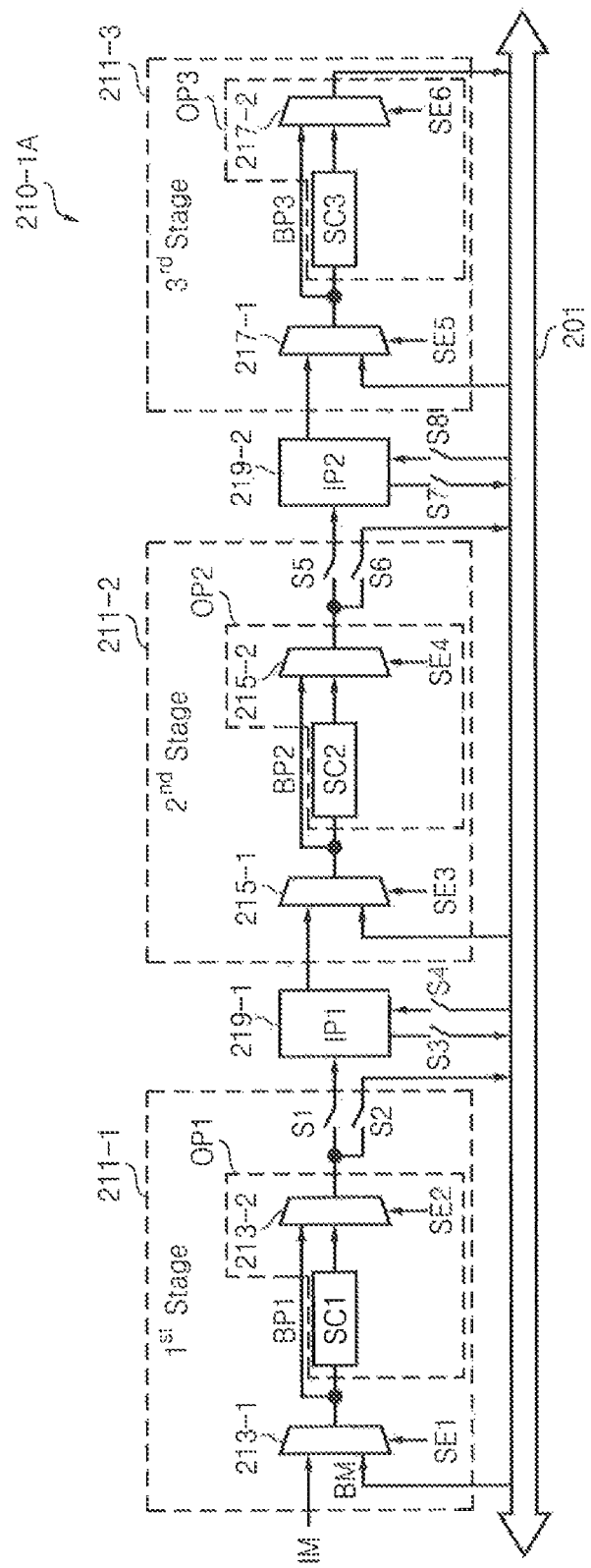
FIG. 2 is a block diagram of a configurable image processing pipeline shown in FIG. 1.

FIG. 2 is a block diagram of the configurable image processing pipeline 210-1A shown in FIG. 1. Referring to FIGS. 1 and 2, the image processing pipeline 210-1A includes pipelined image processing stages 211-1 through 211-3 connected to the bus 201. The two image processing pipelines 210-1A and 210-1B shown in FIG. 1 may have the same structure and function as each other or may have different structures and functions from each other.

The image processing pipeline 210-1A includes at least one image processing module 219-1 and/or 219-2 connected between two adjacent image processing stages 211-1 and 211-2 and/or 211-2 and 211-3 among the image processing stages 211-1 through 211-3. In various other embodiments, the image processing module 219-1 can be included in either of the image processing stages 211-1 and 211-2 and the image processing module 219-2 may be included in either of the image processing stages 211-2 and 211-3.

Three image processing stages 211-1 through 211-3 are shown in FIGS. 2 through 8 for convenience' sake in the description, but this is just an example. The inventive concept is not limited to the illustrated number or form of pipelined image processing stages 211-1 through 211-3.

A first circuit block OP1 is optionally implemented in the first image processing stage 211-1. A second circuit block OP2 is optionally implemented in the second image processing stage 211-2. A third circuit block OP3 is optionally implemented in the third image processing stage 211-3.

The structure and/or operations of an H/W component or an S/W component, that generates the selection signals and/or the switch signals, may be changed according to whether the circuit blocks OP1 through OP3 are implemented in the image processing stages 211-1 through 211-3, respectively. Also, the structure and operations of the image processing pipelines 210-1A and 210-1B may be changed according to whether the circuit blocks OP1 through OP3 are implemented in the image processing stages 211-1 through 211-3, respectively.

In the current exemplary embodiment, the circuit blocks OP1 through OP3 are implemented in the image processing stages 211-1 through 211-3, respectively, for sake of convenience in the description. However, the inventive concept is not limited to the exemplary embodiments.

As described above, selection signals SE1 through SE6 and switch signals S1 through S8 may be generated using an application-specific hardware (H/W) component or a software (S/W) and microprocessor component. The image processing stages 211-1 through 211-3 may respectively include scalers SC1 through SC3 respectively having different scale ratios. The scale ratios may determine the resolution of processed image data.

A connection control circuit connects at least one scaler among the scalers SC1 through SC3 in series using the selection signals SE1 through SE6 and the switch signals S1 through S8 in order to control the number of scalers used to scale (e.g., up-scale or down-scale) image data IM or BM. The connection control circuit includes a plurality of selectors (e.g., multiplexers) 213-1, 213-2, 215-1, 215-2, 217-1, and 217-2 and switches respectively corresponding to the switch signals S1 through S8, wherein switches S1 and S2 can implement a first demultiplexer or branch and switches S5 and S6 can implement a second demultiplexer or branch. First two image processing stages 211-1 and 211-2 include the first demultiplexer/splitter (switches S1 and S2) and the second demultiplexer/splitter (switches S5 and S6), while the last (terminal) image processing stage 211-N (e.g., 211-3, where N equals three) does not include such a demultiplexer/splitter function.

The first image processing stage 211-1 receives the image data IM or BM from one of two different image sources (in response to the corresponding selection signals SE1, and optionally scales it (SC1) or by-passes it (BP1) (n response to the selection signal SE2) and outputs the optionally-scaled image data to at least one (e.g., to a selected one) of the first image processing module 219-1 and the bus 201 (in response to the switch signals S1 and S2).

In other words, the first image processing stage 211-1 may select one internal path from among a plurality of internal or local paths in response to the corresponding selection signals SE1 and SE2 and the corresponding switch signals S1 and S2. The internal paths or local paths are those through which the image data IM or BM is transmitted into and out of the image processing stage. An internal path including a scaler is referred to as a 'scaler path'.

The image data BM on the bus 201 may be image data output from each of the image processing pipelines 210-1A and/or 210-1B, image data output from the internal memory controller 220, image data output from the memory controller 230, image data output from the multimedia H/W IP 260, or image data output from the wireless interface 270.

The first selector 213-1 selects and outputs either one of the image data IM or the image data BM received from the bus 201 in response to the first selection signal SE1. For instance, the image data IM may be image data received through the camera 300 and the camera interface 207 or image data output from another image data source. A first bypass path BP1 allows the selected image data IM or BM output by the first selector 213-1 to bypass the first scaler SC1.

The first scaler SC1 is configured to scale the selected image data IM or BM output from the first selector 213-1 using a first scale ratio. The first scaler SC can be implemented as a down-scaler configured to reduce the resolution of the selected image data IM or BM output from the first selector 213-1.

The second selector 213-2 selects and outputs either one of the unscaled image data (IM or BM) received through the first bypass path BP1 or the scaled output image data (IM or BM) received from the first scaler SC1 (in response to the second selection signal SE2). The image data output from the second selector 213-2 may then be output to one or both of the first image processing module 219-1 and/or the bus 201 through a first switch (turned ON/OFF in response to the first switch signal S1) and a second switch (turned ON/OFF in response to the second switch signal S2).

In other words, the image data output from of the second selector 213-2 can be output to the first image processing module 219-1, to the bus 201, or to both the first image processing module 219-1 and the bus 201 according to the level of each of the switch signals S1 and S2. The switches that operate in response to the switch signals S1 and S2 comprise a first switch block.

The first image processing module 219-1 may be configured to perform correction of bad pixels, noise reduction, and/or support camera 3A operations (e.g., auto exposure, auto white balance, and auto focus). The first image processing module 219-1 transmits image data to the bus 201 through a third switch (turned ON/OFF in response to the third switch signal S3) and receives image data from the bus 201 through a fourth switch (turned ON/OFF in response to the fourth switch signal S4).

The switches that operate in response to the switch signals S3 and S4 comprise a second switch block. The image data BM of the bus 201 may be received/processed by the CPU 203, by the GPU 205, by the at least one image processing pipeline 210-1A and/or 210-1B, by the internal memory controller 220, by the memory controller 230, by the display controller 250, by the at least one the multimedia H/W IP 260-1 and/or 260-2, or by the wireless interface 270.

In various other embodiments, if the first image processing module 219-1 is not implemented within the image processing pipe line 210-1A, the output image data of the second selector 213-2 may be output to the third selector 215-1, to the bus 201, or to both the third selector 215-1 and the bus 201 (according to the level of each of the switch signals S1 and S2).

However, if the first image processing stage 211-1 does not include the first circuit block OP1, the first image processing stage 211-1 may transmit the received image data (IM or BM on the first bypass path BP1) to the first image processing module 219-1, to the bus 201, or to both the first image processing module 219-1 and the bus 201 (according to the level of each of the switch signals S1 and S2).

The second image processing stage 211-2 receives image data from one of three different image sources 211-1, 219-1, and bus 201 (in response to the corresponding signals S1, S4, SE3) and outputs the image data to at least one of the second image processing module 219-2 and the bus 201 (in response to the corresponding switch signals S5 and S6).

The second image processing stage 211-2 can select one internal path from among the plurality of local paths in response to the selection signals SE3 and SE4 and the corresponding switch signals S5 and S6. The second image processing module 219-2 can be implemented as an image signal processor (ISP) IP core or as an image signal processing module that can perform the functions of an ISP.

The third selector 215-1 can output the image data received from either one of the first image processing module 219-1 or the from the bus 201 (in response to the third selection signal SE3). A second bypass path BP2 can be selected to bypass the SC2, so that image data output by the third selector 215-1 passes unchanged into the fourth selector 215-2. The second scaler SC2 is configured to scale the output image data of the third selector 215-1 using a second scale ratio (or to a second predetermined resolution).

The fourth selector 215-2 outputs either one of the unchanged image data received through the second bypass path BP2 or the scaled image data output from the second scaler SC2 (in response to the fourth selection signal SE4). The image data output by the fourth selector 215-2 can be output to the second image processing module 219-2 through a fifth switch (turned ON/OFF in response to the fifth switch signal S5) and/or to the bus 201 through a sixth switch (turned ON/OFF in response to the sixth switch signal S6).

The switches that operate in response to the switch signals S5 and S6 comprise in a third switch block. The image data output from the fourth selector 215-2 can be output to the third second image processing module 219-2, to the bus 201, or to both the second image processing module 219-2 and the bus 201 (according to the level of each of the switch signals S5 and S6).

The second image processing module 219-2 can convert Bayer image data in received Bayer format into YUV data in YUV format or RGB image data in RGB format. The second image processing module 219-2 can receive image data from the bus 201 through an eighth switch (turned ON/OFF in response to the eighth switch signal S8) and may transmit image data to the bus 201 through a seventh switch (turned ON/OFF in response to the seventh switch signal S7). The switches that operate in response to the switch signals S7 and S8 comprise a fourth switch block.

If the second image processing stage 211-2 does not include the second circuit block OP2, the second image processing stage 211-2 can transmit the image data through the second bypass path BP2 to the second image processing module 219-2, to the bus 201, or to both the second image processing module 219-2 and the bus 201 (according to the level of each of the switch signals S5 and S6).

The third image processing stage 211-3 can receive image data from either one of three different image sources 219-2 and 201 in response to the selection signal SE5 and can output image data to the bus 201 selected in response to the selection signal SE6. Thus the third image processing stage 211-3 can select one internal path from among the plurality of local paths in response to the corresponding selection signals SE5 and SE6.

The fifth selector 217-1 selects and outputs image data received from either one of the second image processing module 219-2 or the image data received from the bus 201 (in response to the fifth selection signal SE5). A third bypass path BP3 allows the output image data of the fifth selector 217-1 to bypass a third scaler SC3. The third scaler SC3 scales the output image data of the fifth selector 217-1 using a third scale ratio (or to a third predetermined resolution). The first through third scale ratios (or the first through third predetermined output resolutions) may be different from one another.

The sixth selector 217-2 outputs either the image data received through the third bypass path BP3 or the scaled image data of the third scaler SC3 to the bus 201 in response to the sixth selection signal SE6. However, when the third image processing stage 211-3 does not include the third circuit block OP3, the third image processing stage 211-3 may directly transmit the image data in the third bypass path BP3 to the bus 201.

Another image processing module (or a fourth image processing stage) may be connected to the output of third image processing stage 211-3. In such case, the output image data of the sixth selector 217-2 may be output to at least one of the image processing module (or the fourth image processing stage) and the bus 201 through switches.

Each of the selectors 213-1, 213-2, 215-1, 215-2, 217-1, and 217-2 may be implemented as a multiplexer. Each of the switches may be implemented as a metal oxide semiconductor (MOS) transistor. The first image processing stage 211-1 may a pure Bayer domain, the second image processing stage 211-2 may be a pre-processing Bayer domain, and the third image processing stage 211-3 may be a YUV or RGB domain.

As illustrated in FIGS. 1 and 2, the internal path in the image processing pipeline 210-1A and/or the path between the image processing pipeline 210-1A and the bus 201 are determined depending on the conductive (i.e., ON/OFF) states of the switches controlled by the selection signals SE1 through SE6 and the switch signals S1 through S8.

Accordingly, the selection signals SE1 through SE6 and the switch signals S1 through S8 can control the reception of image data from the camera interface 207, the reception of image data from the image processing pipelines 210-1A and/or 210-1B, the reception of image data from the internal memory controller 220, the reception of image data from the memory controller 230, the reception of image data from the multimedia 1H/W IPs 260-1 and/or 260-2, and/or the reception of image data from the wireless interface 270.

The image processing pipeline 210-1A processes the image data received from the image data sources 203, 205, 207, 210-1A, 210-1B, 220, 230, 260, and/or 270 in the internal paths, thereby reducing the number of accesses to the memories 221 and 400.

According to the selection signals SE1 through SE6 and the switch signals S1 through S8, image data output from each of the image processing stages 211-1, 211-2, and 211-3 may be fed back to itself or another stage through the bus 201.

Figure 3:
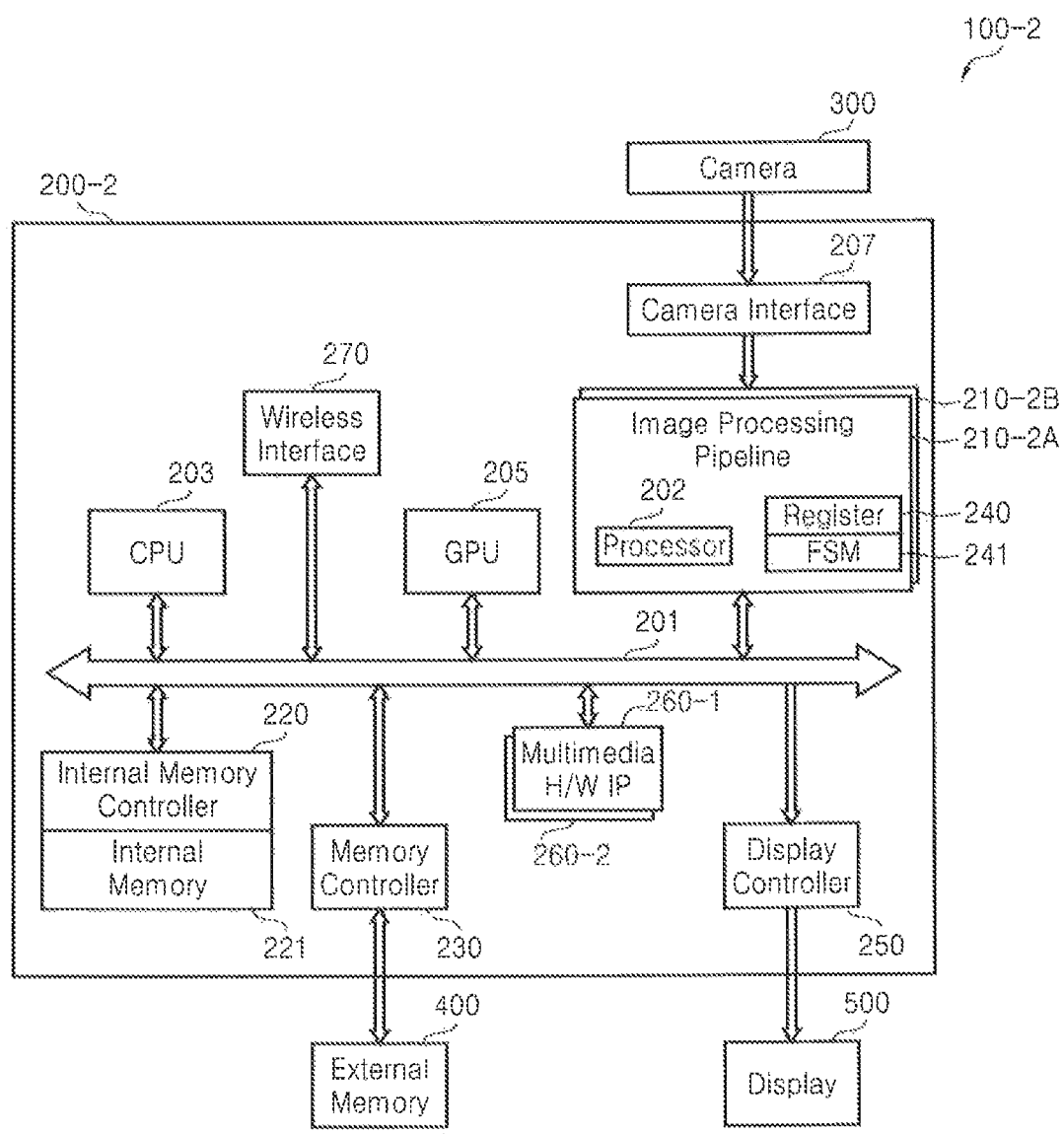
FIG. 3 is a block diagram of an image processing system according to an embodiment of the inventive concept.

FIG. 3 is a block diagram of an image processing system 100-2 according to an embodiment of the inventive concept. Except for the structure of image processing pipelines 210-2A and 210-2B, the structure and operations of a processor 200-2 shown in FIG. 3 are substantially the same as those of the processor 200-1 shown in FIG. 1.

Each of the image processing pipelines 210-2A and 210-2B (collective denoted by 210-2) includes an internal processor 202, a register 240, and a FSM 241. The internal processor 202 controls the operations of a corresponding one of the image processing pipelines 210-2A. The structure and operations of the register 240 and the FSM 241 included in each of the image processing pipelines 210-2A and 210-2B are substantially the same as that of the register 240 and the FSM 241 that have been describe with reference to FIG. 1.

Figure 4:
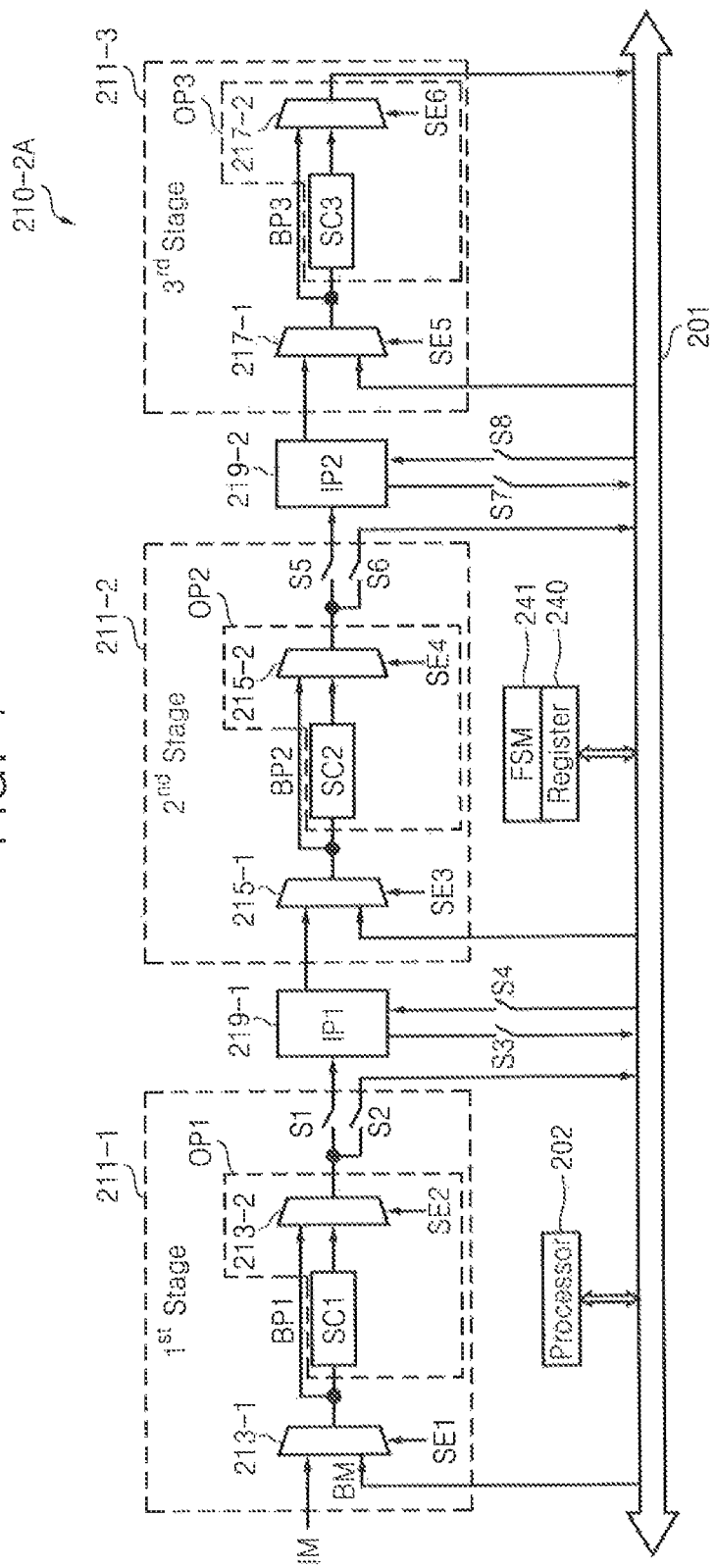
FIG. 4 is a block diagram of a configurable image processing pipeline shown in FIG. 3.

FIG. 4 is a block diagram of the configurable image processing pipeline 210-2A shown in FIG. 3. The structure and operations of the image processing pipeline 210-2 shown in FIG. 4 are substantially the same as those of the image processing pipeline 210-1 shown in FIG. 2 with the exception that the internal processor 202, the register 240, and the FSM 241 are included in the image processing pipeline 210-2.

FIGS. 5 through 8 are conceptual diagrams illustrating exemplary configurations and operations of the configurable image processing pipeline shown in FIG. 1 or 3. Processing high-quality image data will be described with reference to FIGS. 1, 2, 4, and 5. For sake of convenience in the description, it is assumed that the second image processing stage 211-2 includes an image enhancement module EM that performs substantially the same functions as or similar functions to the first image processing module 219-1.

In the image processing pipelines 210-1A, 210-1B, 210-2A, and 210-2B (collectively denoted by 210A), an image data processing path for processing the image data IM or BM is selected according to the selection signals SE1 through SE6 and the switch signals S1 through S8.

Figure 5:
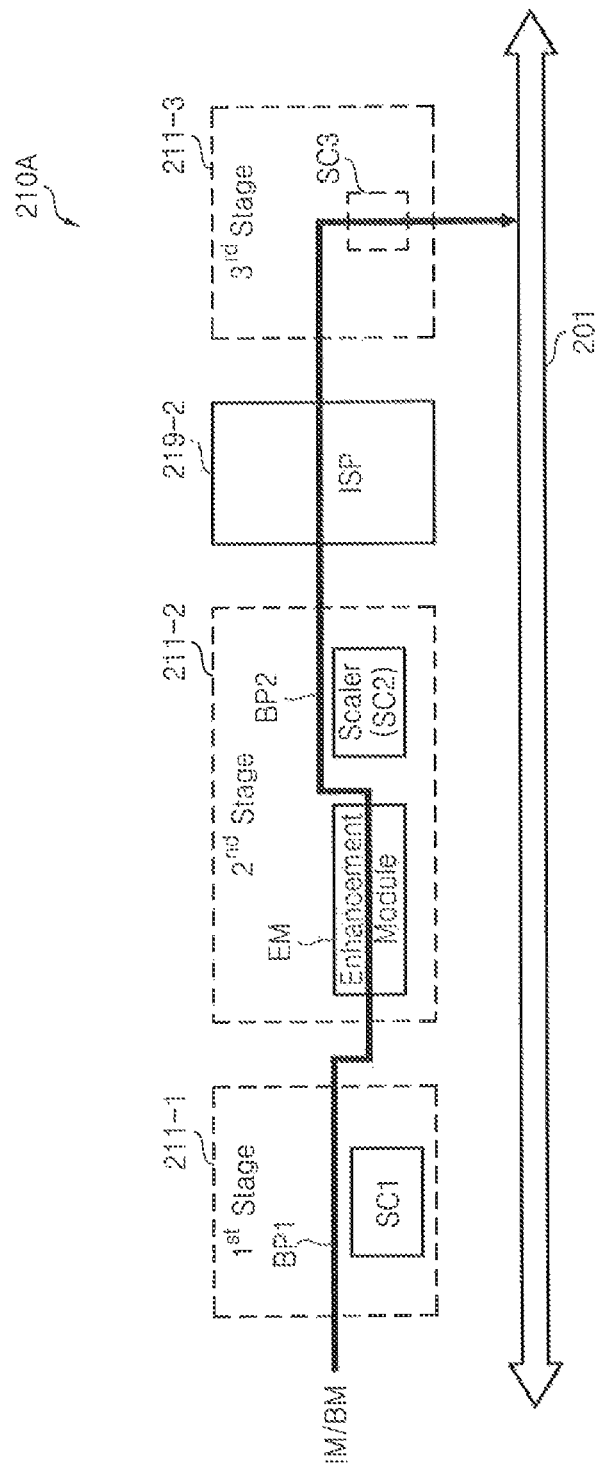
FIGS. 5 through 8 are conceptual diagrams illustrating the configuration operation of the configurable image processing pipeline shown in FIG. 1 or 3.

For instance, in the example of FIG. 5, the first bypass path BP1 is selected by the selectors 213-1 and 213-2 in the first image processing stage 211-1, the second bypass path BP2 is selected by the selectors 215-1 and 215-2 in the second image processing stage 211-2, and the third scaler SC3 is selected by the selectors 217-1 and 217-2 in the third image processing stage 211-3. The image data IM or BM is transmitted to the image enhancement module EM through the first bypass path BP1. The image enhancement module EM processes (for example, performs bad pixel correction, noise reduction, and/or camera 3A on) the image data IM or BM and transmits processed image data to the second image processing module 219-2 through the second bypass path BP2.

The second image processing module 219-2 can convert Bayer image data into YUV image data or RGB image data. The third scaler SC3 scales (for example, up-scales or down-scales) the YUV or RGB image data output from the second image processing module 219-2 and outputs scaled image data to the bus 201.

Processing 'preview' image data or camcorder image data will be described with reference to FIGS. 1, 2, 3, and 6. For instance, when there is a large difference between the resolution of the camera 300 and the resolution of the display 500, a plurality of the scalers SC1 through SC3 may be used to record/display video data taking into account both power consumption and picture quality.

An image data processing path for the processing of the image data IM or BM in an image processing pipeline 210-1A, 210-1B, 210-2A, and 210-2B (collectively denoted by 210B) is selected according to the selection signals SE1 through SE6 and the switch signals S1 through S8.

Figure 6:
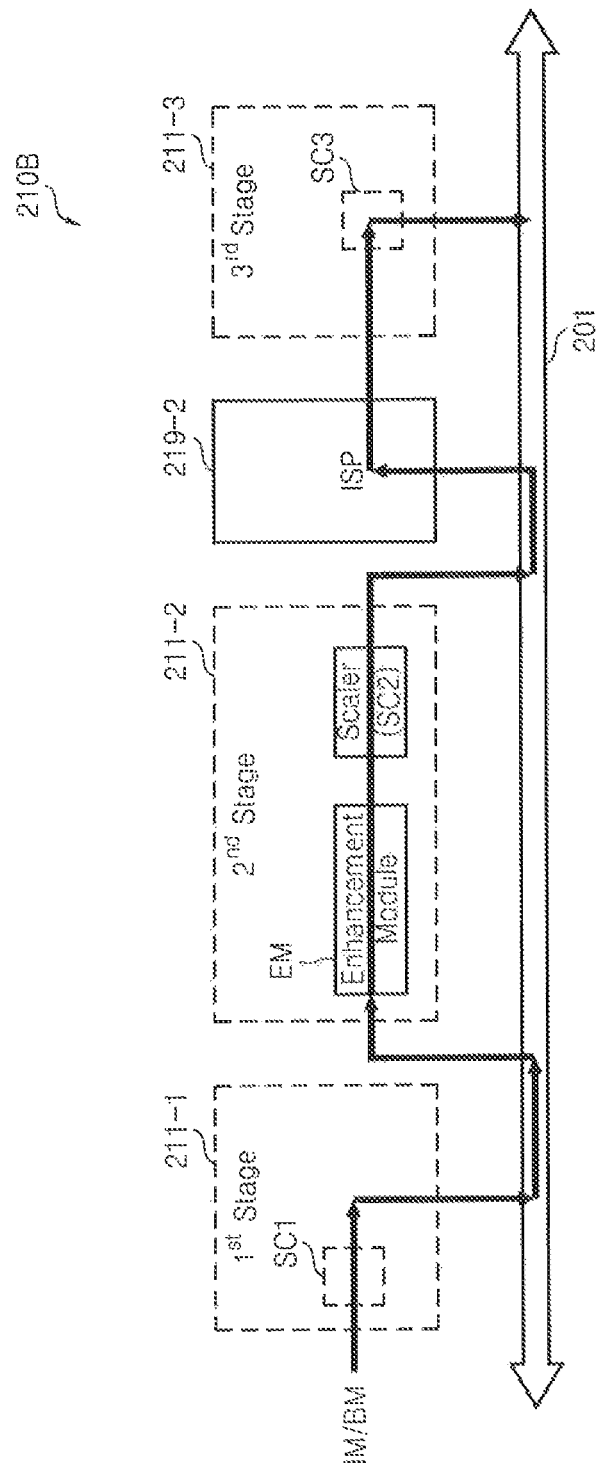

As shown in the example of FIG. 6, the first scaler SC1 is selected in the first image processing stage 211-1, the second scaler SC2 is selected in the second image processing stage 211-2, and the third scaler SC3 is selected in the third image processing stage 211-3. Image data output from the first image processing stage 211-1 is transmitted to the image enhancement module EM through switches respectively turned ON in response to the switch signals S2 and S4 that have been activated. Image data output from the second image processing stage 211-2 is transmitted to the second image processing module 219-2 through switches respectively turned ON in response to the switch signals S6 and S8 that have been activated. Image data output from the third image processing stage 211-3 is output to the bus 201 through the sixth selector 217-2. The image data IM or BM output from the first selector 213-1 is scaled (for example, down-scaled) by the first scaler SC1 and then is output to the bus 201 through the second selector 213-2 and the switch turned ON in response to the second switch signal S2. The image data is transmitted from the bus 201 to the image enhancement module EM through the switch turned ON in response to the fourth switch signal S4. Image data output from the image enhancement module EM is transmitted to the second scaler SC2 through the third selector 215-1. The image data scaled by the second scaler SC2 is output to the bus 201 through the fourth selector 215-2 and the switch turned ON in response to the sixth switch signal S6. The image data is transmitted from the bus 201 to the second image processing module 219-2 through the switch turned ON in response to the eighth switch signal S8. Image data output from the second image processing module 219-2 is transmitted to the third scaler SC3 through the fifth selector 217-1. The image data scaled by the third scaler SC3 is output to the bus 201 through the sixth selector 217-2.

Processing low-power camcorder image data will be described with reference to FIGS. 1, 2, 4, and 7. When camcording is performed for a long time at low power, the first image processing stage 211-1 down-scales the image data IM or BM using the first scaler SC1 in order to reduce power consumption.

An image data processing path for the processing of the image data IM or BM in an image processing pipeline 210-1A, 210-1B, 210-2A, and 210-2B (collectively denoted by 210C) is selected according to the selection signals SE1 through SE4 and the switch signals S1 through S8.

Figure 7:
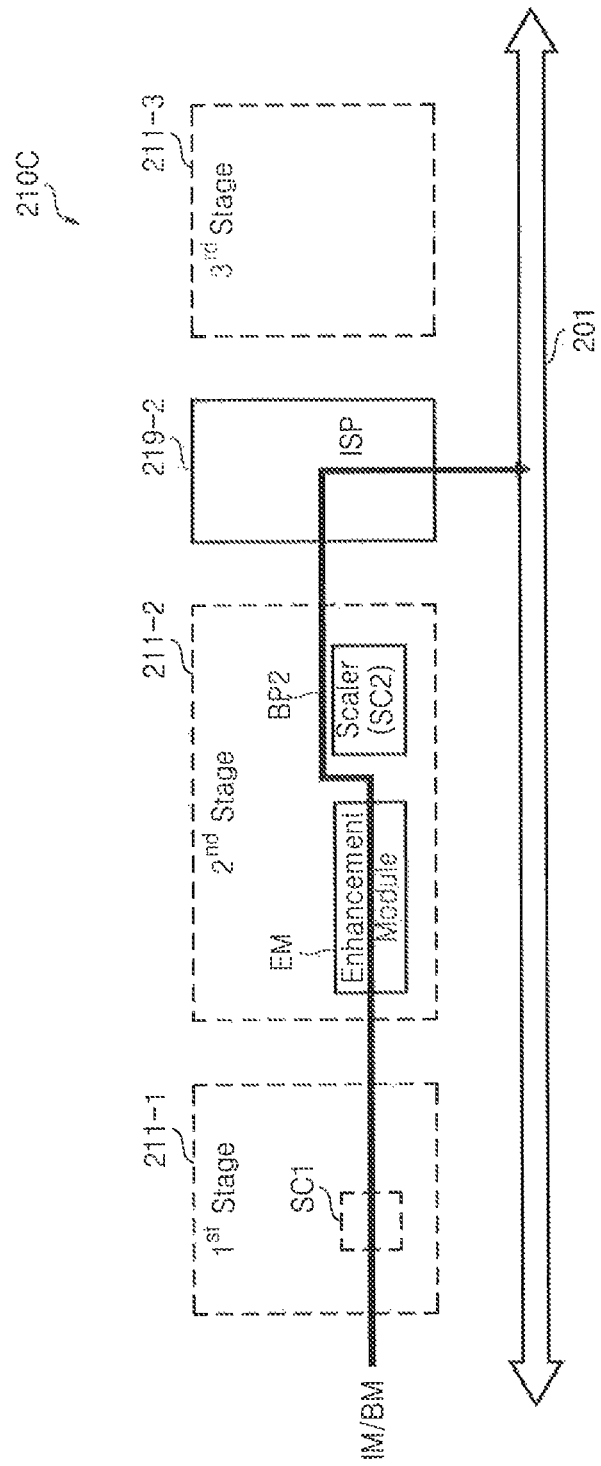

As shown in the example of FIG. 7, the first scaler SC1 is selected in the first image processing stage 211-1, the second bypass path BP2 is selected in the second image processing stage 211-2, and the third image processing stage 211-3 is disabled. The image data IM or BM output from the first selector 213-1 is down-scaled by the first scaler SC1. Down-scaled image data is output to the image enhancement module EM through the second selector 213-2 and the switch turned ON in response to the first switch signal S1 that has been activated. The image data processed by the image enhancement module EM is transmitted to the fourth selector 215-2 through the third selector 215-1 and the second bypass path BP2. Image data output from the fourth selector 215-2 is transmitted to the second image processing module 219-2 through the switch turned ON in response to the fifth switch signal S5 that has been activated. The image data processed by the second image processing module 219-2 is transmitted to the bus 201 through the switch turned ON in response to the seventh switch signal S7 that has been activated. At this time, the switch turned OFF in response to the eighth switch signal S8 that has been deactivated cuts off the connection between the bus 201 and the second image processing module 219-2. Processing low-power multiple output image data will be described with reference to FIG. 8. For instance, the image data IM or BM is processed by the first through third image processing stage 211-1, 211-2, and 211-3 and a plurality of scaled image data having different resolutions from each other are simultaneously output. Accordingly, the number of accesses to at least one of the memories 221 and 400 is reduced. As a result, the power consumption of an image processing pipeline 210-1A, 210-1B, 210-2A, and 210-2B (collectively denoted by 210D) is reduced.

An image data processing path for the processing of the image data IM or BM in the image processing pipeline 210D is selected according to the selection signals SE1 through SE6 and the switch signals S1 through S8.

Figure 8:
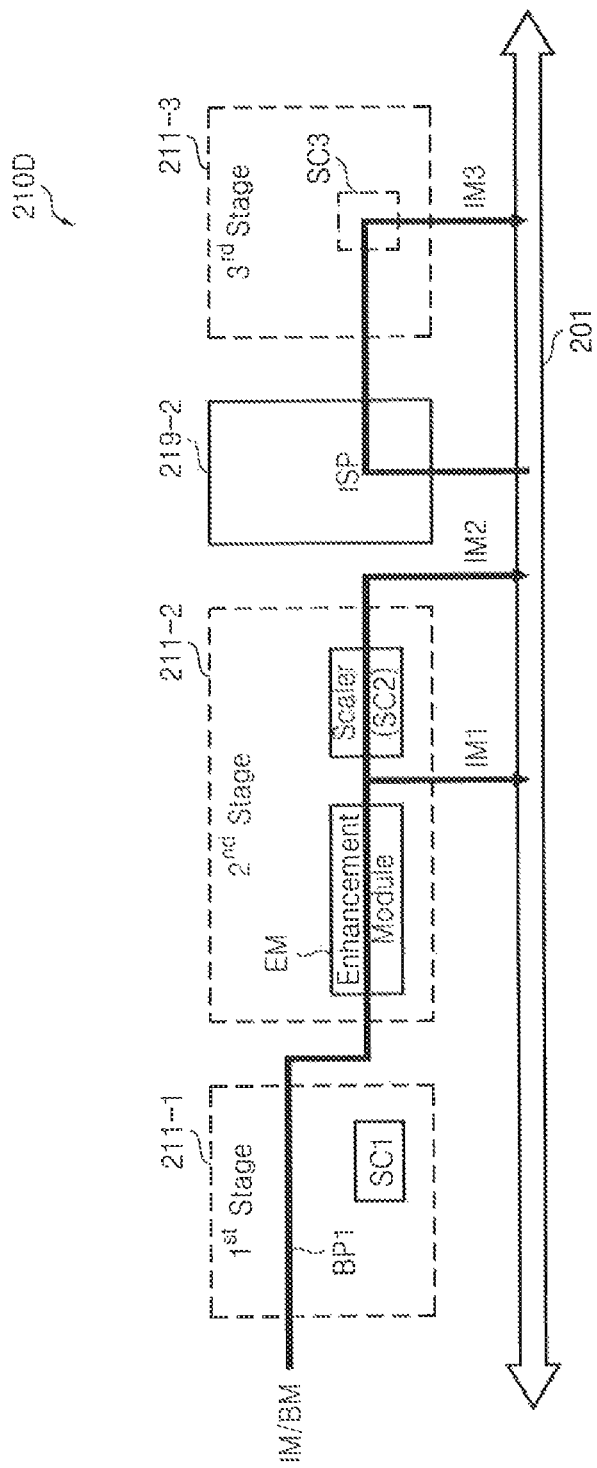

Referring to FIGS. 2 and 8, the first bypass path BP1 is selected in the first image processing stage 211-1, the second scaler SC2 is selected in the second image processing stage 211-2, and the third scaler SC3 is selected in the third image processing stage 211-3. The image data IM or BM output from the first selector 213-1 is output to the second selector 213-2 through the first bypass path BP1. Image data output from the second selector 213-2 is transmitted to the image enhancement module EM through the switch turned ON in response to the first switch signal S1 that has been activated. Image data IM1 processed by the image enhancement module EM is output to the bus 201 through the switch turned ON in response to the third switch signal S3 that has been activated and is also output to the third selector 215-1. Image data IM2 scaled by the second scaler SC2 is output to the bus 201 through the fourth selector 215-2 and the switch turned ON in response to the sixth switch signal S6 that has been activated. Image data on the bus 201 is transmitted to the second image processing module 219-2 through the switch turned ON in response to the eighth switch signal S8 that has been activated. The image data processed by the second image processing module 219-2 is transmitted to the third scaler SC3 through the fifth selector 217-1. Image data 1M3 scaled by the third scaler SC3 is output to the bus 201 through the sixth selector 217-2.

When the delay of each of the elements EM, 215-1, SC2, 215-2, 219-2, 217-1, SC3, and 217-2 is appropriately designed and their interconnections are configured accordingly, the multiple image data IM1, IM2, and IM3 can be simultaneously output to the bus 201.

Figure 9:
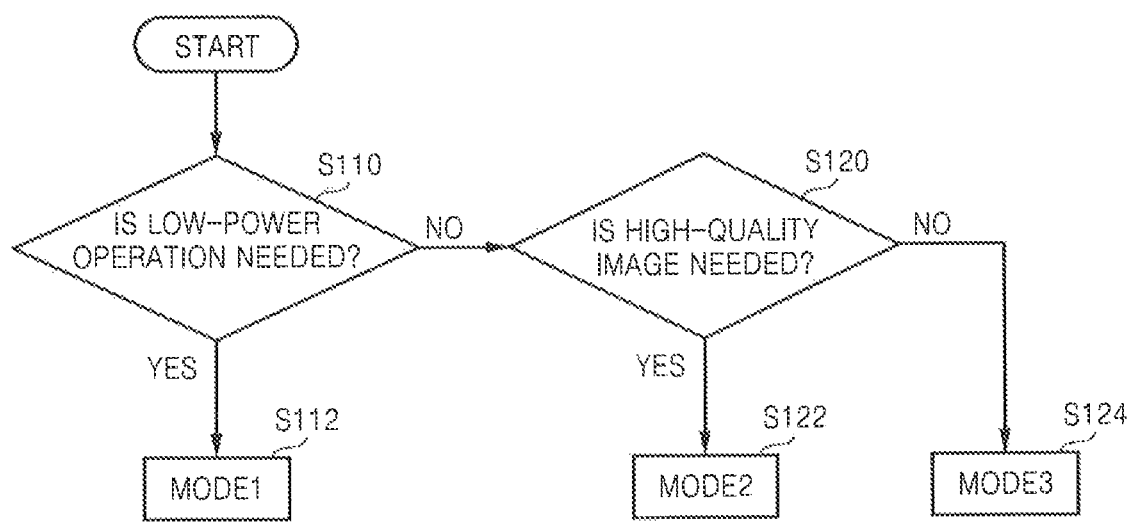
FIG. 9 is flowchart for explaining operation modes of the configurable image processing pipeline shown in FIG. 1 or 3 with respect to the purpose of use.

FIG. 9 is flowchart for explaining three operation modes of the configurable image processing pipelines 210-1A and 210-1B or 210-2A and 210-2B (collectively denoted by 210) shown in FIG. 1 or 3 with respect to the purpose of use. Referring to FIGS. 1 through 9, when a low-power operation is needed in the image processing pipeline 210 in step S110, a first mode MODE1 is selected by the selection signals SE1 through SE6 and the switch signals S1 through S8 in step S112.

When the low-power operation is not needed in the image processing pipeline 210 in step S110 and when high-quality image data is needed in step S120, a second mode MODE2 is selected by the selection signals SE1 through SE6 and the switch signals S1 through S8 in step S122. When the low-power operation is not needed in the image processing pipeline 210 in step S110 and when the high-quality image data is not needed in step S120, a third mode MODE3 is selected by the selection signals SE1 through SE6 and the switch signals S1 through S8 in step S124.

As shown in FIG. 9, a user may perform a trade-off between picture quality and power consumption. For instance, the image processing system 100-1 or 100-2 (collectively denoted by 100) may provide a graphical user interface (GUI), which indicates or implies each of the modes MODE1, MODE2, and MODE3, for a user so that the user selects a wanted mode through the GUI. Then, an H/W or S/W component may generate the selection signals SE1 through SE6 and the switch signals S1 through S8 which correspond to the selected mode. In response, the image processing pipeline 210 controls the number of scalers needed to process image data in response to the selection signals SE1 through SE6 and the switch signals S1 through S8 that have been generated.

Since the S/W component can control the combination of pipelined image processing stages using data (or a configuration table), which is stored in the register 240 and is needed to generate the selection signals SE1 through SE6 and the switch signals S1 through S8, the register 240 or the configuration table can be set in a short time. In other words, since the S/W component can control the number of scalers needed to process image data using the configuration table, the image processing system 100 can reduce the involvement and use time of the S/W component.

Figure 10:
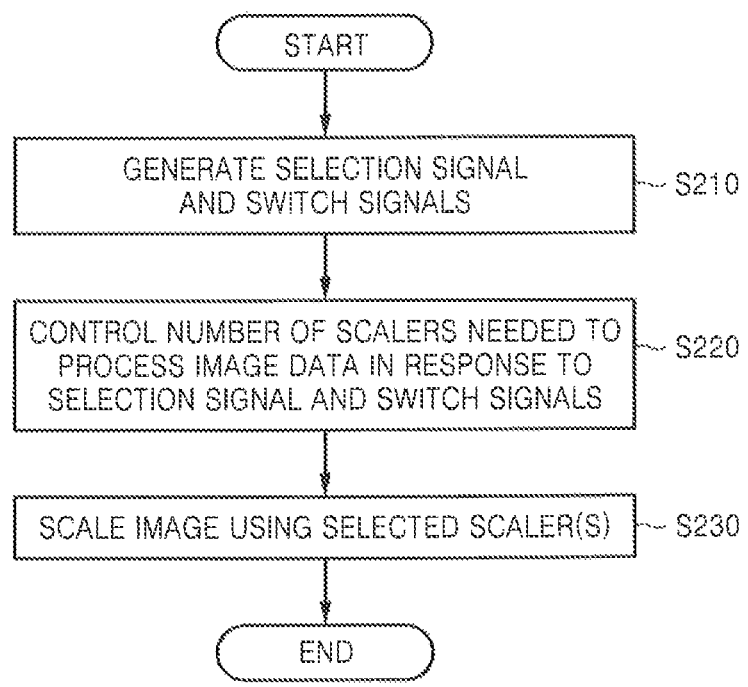
FIG. 10 is a flowchart illustrating the operations of the configurable image processing pipeline shown in FIG. 1 or 3.

FIG. 10 is a flowchart illustrating the operations of the configurable image processing pipeline 210 shown in FIG. 1 or 3 according to some embodiments of the inventive concept. Referring to FIGS. 1 through 10, control signals, e.g., the selection signals SE1 through SE6 and the switch signals S1 through S8 are generated using an H/W or S/W component in step S210.

The image processing pipeline 210 connects in series at least one scaler among a plurality of the scalers SC1 through SC3, which are respectively included in the pipeline image processing stages 211-1 through 211-3 and have different scale ratio from one another, in response to the control signals, i.e., the selection signals SE1 through SE6 and the switch signals S1 through S8, thereby controlling the number of scalers needed to scale the image data IM or BM in step S220. The image processing pipeline 210 scales the image data IM or BM using the at least one selected scaler and outputs at least one image data set that has been scaled to the bus 201 in step S230.

As described above, according to some embodiments of the inventive concept, a SoC including a configurable image processing pipeline connects in series at least one scaler among a plurality of scalers in response to control signals, thereby controlling the number of scalers used to scale image data. In addition, the SoC processes image data using the configurable image processing pipeline in an internal path, thereby reducing the number of accesses to memory related with storing the image data. Also, the SoC easily reconfigures internal paths in pipelined image processing stages implemented in the SoC according to the purpose of use. Since the SoC can reconfigure the internal paths in the pipelined image processing stages using a configuration table, the involvement of an H/W component and S/W component in the reconfiguration is minimized and the configuration table is set quickly.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:
1. A system on chip (SoC) comprising:
a bus;
a first image processing module, for receiving image data, switchably connected to the bus, and configured to process the received image data into third image data;
a first image processing stage configured to transmit either
first image data or
second image data received from the bus
as the received image data to at least one of
the bus and
the first image processing module in response to first control signals; and
a second image processing stage configured to transmit either
the third image data received from the first image processing module or
fourth image data received from the bus
to the bus through one of
a second bypass path and
a second scaler path including a second scaler
in response to second control signals.

2. The SoC of claim 1, wherein when the first image processing stage further comprises a first scaler path, wherein the first image processing stage transmits either
the first image data or
the second image data
to at least one of
the bus and
the first image processing module through one of
a first bypass path and
the first scaler path including a first scaler
in response to third control signals including the first control signals.

3. The SoC of claim 2, wherein the third image data is related with image data output from the first image processing stage or image data received through the bus.

4. The SoC of claim 2, wherein a scale ratio of the first scaler is different from a scale ratio of the second scaler.

5. The SoC of claim 2, further comprising a register configured to generate the second control signals and the third control signals.

6. The SoC of claim 2, further comprising a central processing unit (CPU) configured to execute software related with generation of the second control signals and the third control signals.

7. The SoC of claim 1, further comprising one of
a second image processing module and
a third image processing stage, which are connected to the bus,
wherein the second image processing stage transmits image data received through one of
the second bypass path and
the second scaler path,
to at least one of
the second image processing module and
the third image processing stage
using switches.

8. A system on chip (SoC) comprising:
a bus;
a first image processing module switchably connected to the bus and configured to process received image data;
a first image processing stage configured to transmit either
first image data
or second image data received from the bus
as the received image data to at least one of
the bus and
the first image processing module
through one of
a first bypass path and
a first scaler path
in response to first control signals; and
a second image processing stage configured to transmit either
third image data received from the first image processing module or
fourth image data received from the bus
to the bus in response to second control signals.

9. The SoC of claim 8, wherein the second image processing stage further comprises
a second scaler path and
a second bypass path,
and wherein the second image processing stage transmits either
the third image data or
the fourth image data
to the bus through one of
the second bypass path and
the second scaler path
in response to third control signals including the second control signals.

10. The SoC of claim 9, wherein a scale ratio of a first scaler comprised in the first scaler path is different from a scale ratio of a second scaler comprised in the second scaler path.

11. The SoC of claim 9, further comprising a register configured to generate the first control signals and the third control signals.

12. The SoC of claim 9, further comprising a central processing unit (CPU) configured to execute software related with generation of the first control signals and the third control signals.

13. The SoC of claim 9, further comprising one of a second image processing module and a third image processing stage, which are connected to the bus,
wherein the second image processing stage transmits image data, which is transmitted through one of the second bypass path and the second scaler path, to at least one between the one of the second image processing module and the third image processing stage using switches.

14. The SoC of claim 8, further comprising switches configured to control connection between the first image processing module and the bus.

15. An image processing system for processing image data from a plurality of image data sources, the system comprising:
an application processor configured to control the image data sources,
wherein the application processor comprises:
a bus;
a first image processing module switchably connected to the bus and configured to process received image data;
a first image processing stage configured to transmit either
first image data output from one of the image data sources
or second image data received from the bus
as the received image data to at least one of
the bus and
the first image processing module
in response to first control signals; and
a second image processing stage configured to transmit either
third image data received from the first image processing module or
fourth image data received from the bus
to the bus through one of
a second bypass path and
a second scaler path
in response to second control signals.

16. The image processing system of claim 15, wherein the first image processing stage further comprises a first scaler path, and wherein the first image processing stage transmits either
the first image data or
the second image data
to at least one of
the bus
and the first image processing module
through one of
a first bypass path and
the first scaler path
in response to third control signals including the first control signals.

17. The image processing system of claim 16, wherein a scale ratio of a first scaler comprised in the first scaler path is different from a scale ratio of a second scaler comprised in the second scaler path.

18. The image processing system of claim 16, further comprising a central processing unit (CPU) configured to execute software related with generation of the second control signals and the third control signals.

\* \* \* \* \*